(12) United States Patent
Appavu (10) Patent No.: US 9,703,830 B2
(45) Date of Patent: Jul. 11, 2017

(54) TRANSLATION OF A SPARQL QUERY TO A SQL QUERY

(71) Applicant: International Business Machines Corporation, Armonk, NY (US)

(72) Inventor: Rajendran Appavu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/511,171

(22) Filed: Oct. 9, 2014

(65) Prior Publication Data

US 2016/0103931 A1 Apr. 14, 2016

(51) Int. Cl.
*G06F 7/00* (2006.01)
*G06F 17/30* (2006.01)

(52) U.S. Cl.
CPC .... *G06F 17/3043* (2013.01); *G06F 17/30436* (2013.01)

(58) Field of Classification Search
CPC ...... G06F 9/4881; G06F 9/546; G06F 12/123; G06F 2207/226; G06F 2209/548; G06F 17/3043; G06F 17/30436
USPC .......................... 707/760, 797, 798, 999.004
See application file for complete search history.

(56) References Cited

U.S. PATENT DOCUMENTS

| 5,872,938 | A | * | 2/1999 | Williams | .......... | G06F 17/30958 |
| | | | | | | 707/E17.011 |
| 6,038,509 | A | * | 3/2000 | Poppen | .............. | G01C 21/3415 |
| | | | | | | 701/26 |
| 6,356,911 | B1 | * | 3/2002 | Shibuya | ............. | G01C 21/3446 |
| 6,931,418 | B1 | * | 8/2005 | Barnes | .............. | G06F 17/30333 |
| | | | | | | 707/600 |
| 7,613,712 | B2 | * | 11/2009 | Greenblatt | ........ | G06F 17/30584 |
| 7,818,352 | B2 | | 10/2010 | Krishnamoorthy et al. | | |
| 7,979,455 | B2 | | 7/2011 | Krishnamoorthy et al. | | |
| 8,250,048 | B2 | | 8/2012 | Yalamanchi et al. | | |
| 8,275,784 | B2 | | 9/2012 | Cao et al. | | |

(Continued)

FOREIGN PATENT DOCUMENTS

| KR | 100912190 B1 | 8/2009 |
| WO | 2011065612 A1 | 6/2011 |

OTHER PUBLICATIONS

Chebotko, A. et al. "Semantics preserving SPARQL-to-SQL query translation for optional graph patterns." Wayne State University, Tech. Rep. TR-DB-052006-CLJF; May 2006.

(Continued)

*Primary Examiner* — Mohammed R Uddin
(74) *Attorney, Agent, or Firm* — North Shore Patents, P.C.; Michele Liu Baillie (57) ABSTRACT

In the processing of a query while being translated from the SPARQL language to the SQL language, a manner of navigation through the one or more graphs is provided. The plurality of the nodes in the one or more graphs generated from the query is identified. The plurality of the nodes are assigned a priority and arranged in the priority queue based on the assigned priorities. The node with a highest assigned priority is selected each time for execution of the query from the selected node. The one or more graphs are navigated from the selected node to traverse to the one or more nodes connected with the selected node. An access plan element is generated corresponding to the selected nodes and the one or more traversed nodes.

18 Claims, 5 Drawing Sheets

(56) References Cited

U.S. PATENT DOCUMENTS

| | | | |
|---|---|---|---|
| 8,412,720 B2 | 4/2013 | Britton et al. | |
| 9,448,995 B2* | 9/2016 | Kurz | G06F 17/28 |
| 2004/0064475 A1* | 4/2004 | Maeda | G06F 17/30905 |
| 2004/0098670 A1* | 5/2004 | Carroll | G06N 5/046 |
| | | | 715/243 |
| 2005/0289134 A1* | 12/2005 | Noguchi | H04L 67/02 |
| 2006/0004721 A1* | 1/2006 | Bedworth | G06F 17/3043 |
| 2006/0235823 A1 | 10/2006 | Chong et al. | |
| 2008/0040308 A1 | 2/2008 | Ranganathan et al. | |
| 2008/0276241 A1* | 11/2008 | Bajpai | G06F 9/546 |
| | | | 718/103 |
| 2008/0294644 A1* | 11/2008 | Liu | G06F 17/2785 |
| 2009/0132474 A1* | 5/2009 | Ma | G06F 17/30451 |
| 2009/0138437 A1* | 5/2009 | Krishnamoorthy | G06F 17/30448 |
| 2010/0241644 A1* | 9/2010 | Jackson | G06F 17/30392 |
| | | | 707/760 |
| 2011/0040717 A1* | 2/2011 | Rho | G06F 17/30864 |
| | | | 706/50 |
| 2011/0225167 A1 | 9/2011 | Bhattacharjee et al. | |
| 2011/0238683 A1 | 9/2011 | Kim et al. | |
| 2012/0047124 A1 | 2/2012 | Duan et al. | |
| 2012/0054860 A1 | 3/2012 | Wyschogrod et al. | |
| 2012/0102022 A1* | 4/2012 | Miranker | G06F 17/30427 |
| | | | 707/713 |
| 2012/0136875 A1* | 5/2012 | Pan | G06F 17/30902 |
| | | | 707/748 |
| 2012/0239372 A1* | 9/2012 | Kruus | G06F 17/5022 |
| | | | 703/17 |
| 2012/0254102 A1 | 10/2012 | Li et al. | |
| 2012/0290427 A1* | 11/2012 | Reed | G06Q 50/01 |
| | | | 705/26.2 |
| 2013/0080461 A1* | 3/2013 | Byrne | G06F 17/30958 |
| | | | 707/769 |
| 2013/0262501 A1* | 10/2013 | Kuchmann-Beauger | G06F 17/30451 |
| | | | 707/769 |
| 2013/0262502 A1 | 10/2013 | Majeed et al. | |
| 2013/0318070 A1 | 11/2013 | Wu et al. | |
| 2013/0346445 A1* | 12/2013 | Mizell | G06F 17/30908 |
| | | | 707/774 |
| 2014/0172914 A1* | 6/2014 | Elnikety | G06F 17/30979 |
| | | | 707/774 |
| 2014/0279957 A1* | 9/2014 | Moore | G06F 17/30958 |
| | | | 707/692 |
| 2016/0050294 A1* | 2/2016 | Kruse | H04L 67/327 |
| | | | 709/201 |

OTHER PUBLICATIONS

Duan, S., et al; "Apples and Oranges: a Comparison of RDF Benchmarks and Real RDF Datasets"; Proceedings of the 2011 ACM SIGMOD International Conference on Management of data; pp. 145-156; Jun. 2011.

Harris, S., et al; "3store: Efficient bulk RDF storage."; pp. 1-15; Oct. 2003.

Hartig O., et al; "The SPARQL Query Graph Model for Query Optimization"; The Semantic Web: Research and Applications. Springer Berlin Heidelberg; pp. 564-578; Jun. 2007.

Liu, C., et al.; "Toward Efficient SPARQL Query Processing on RDF Data"; Tsinghua Science and Technology, vol. 15, No. 6; pp. 613-622; Dec. 2010.

Magliacane, S. et al; "Efficient Execution of Top-K SPARQL Queries"; The Semantic Web—ISWC 2012, Lecture Notes in Computer Science; vol. 7649, pp. 344-360; Jan. 2012.

Prud'Hommeaux, E. et al; "SPARQL Query Language for RDF" (Abstract); W3C Reocmmendation; Jan. 2008.

\* cited by examiner

TRANSLATION OF A SPARQL QUERY TO A SQL QUERY

BACKGROUND

Technical Field

The present invention generally relates to a field of translation of a SPARQL query to a SQL query. More specifically, to a manner of navigating through the one or more generated graphs for translation.

Description of Related Art

Resource Description Framework (RDF) is a family of World Wide Web Consortium® (W3C)® based on an idea of making statements about resources in a triples format. In RDF, the triples describe data as consisting of three parts: subject, predicate and object. The subject is referred to as resource and can be a person, place or thing. The predicate identifies a property of the subject. The predicate may be any specific aspect, attribute, or relation used to describe the resource (subject). The object gives a "value" to the predicate (property). The objects can be literals, or strings that identify or name the corresponding property (predicate).

Generally, the given subject may include multiple predicates, each predicate further indexing the object. Commonly, the object may itself be another subject, with its own objects and predicates. In some cases, the resource can be both the subject and the object, e.g., the object to all upstream resources and the subject to all downstream resources and properties.

RDF triples are also termed as RDF graphs. In the RDF graph, at least two of the subject and object may be modelled as nodes, connected or joined with one another through predicates. The predicates may be modelled as arrows or arcs. In an example, the RDF graph may describe a T-Shirt is white in shade as follows. In this example, the subject is the T-shirt, the predicate (property) is the shade, and the object is white.

Much like a relational database, information on RDF graphs/RDF triples are stored in a database called as triples store. The triples store contain the collection of graphs as a set of "subject-predicate-object" triples. Different triples store have different storage designs. In one example, the triples store may contain triples arranged in tables. The table may comprise a subject column, a predicate column and an object column. In the table, rows of the column describe an element/data/item of the triple. In another example, the triples for the given subject could be represented as a row, with the subject being the primary key and each possible predicate being the column and the object being the value in the cell. In yet another design example, the components of the triples may be indexed and stored to respective tables by following the "hashed with origin" approach.

Most of the existing commercial triples store are either native triples store or the triples stores realized using the existing relational databases. The existing relational databases generally have Structured Query Language (SQL) based engines. The SQL based engines can perform queries in the Structured Query Language (SQL). The SQL queries take into account an underlying storage schema of the existing database. However, the queries may be made in a schema less query language such as Simple Protocol and RDF Query Language (SPARQL). The SPARQL query may run on top of the existing databases supporting the SQL. In one implementation, the SPARQL query may be run on the triples store having a native SPARQL query engine. In another implementation, where the triples store is realized using the existing relational databases, the queries in the SPARQL language are translated into the corresponding SQL queries for execution in the relational databases.

Information about data contained in the RDF graphs is retrieved via the query. For processing the query, databases are navigated to retrieve the data (triples). Since the data is stored in columns in the tables, processing of queries, requires the data from across the tables to be joined. The columns are joined by a union operation across multiple tables. The query engine itself chooses a way to join the tables while executing the query. As a result of these joins between the columns and/or between tables, even the simple query consumes lot of time. Hence, retrieval of data from the triples store remains a deficiency in using the databases efficiently.

A reliable manner of processing the query is desired that allows an effective translation of the SPARQL query into the SQL query language.

SUMMARY

The embodiments herein provide a method, a computer program product and a system for translation of a SPARQL query to a SQL query. In one implementation, one or more graphs are generated based on the SPARQL query. The one or more graphs comprise a plurality of nodes. The plurality of nodes IS assigned a priority. A priority queue is generated based on the assigned priority. One of the plurality of the nodes with a highest assigned priority from the priority queue is selected. The one or more graphs are navigated to traverse to the one or more nodes of the plurality of nodes connected to the selected node. When the navigation is complete, an access plan element is generated of the SQL query for the one or more nodes traversed and the selected node.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are illustrations for clarity and not to scale.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
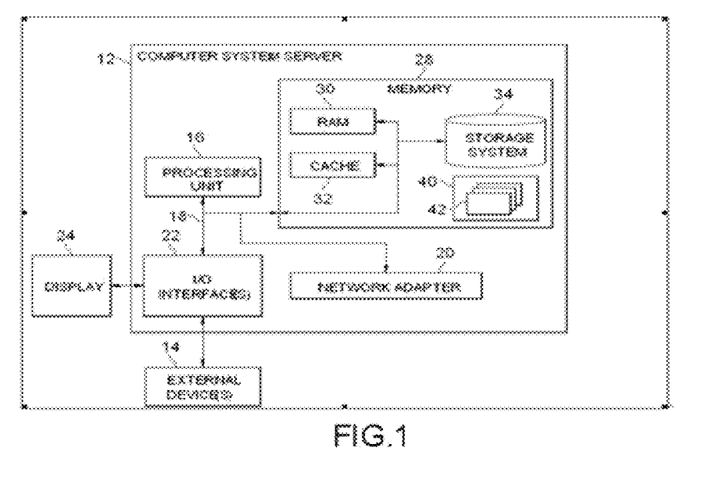
FIG. 1 illustrates a block diagram of an exemplary computer system/server 12 which is applicable to implement the embodiments.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The SPARQL is a schema less query language. A syntax of the SPARQL query is termed as a graph pattern. The SPARQL query, specifies the graph patterns to be matched by the data present in the database.

The graph pattern is like the triples except that subject, predicate and object components of the syntax may be a variable. The variables are prefixed with the question mark ("?") symbol. The components in the graph pattern (subject, predicate, and object), define constraints to be matched while finding a corresponding match (data/triples) in the database.

The matching results of the data (triples) are to be returned by the query. In one example, the result of the query may be a solution sequence, corresponding to the ways in which the graph pattern is matched with the data. There may be zero, one or multiple solutions to the query.

In the SPARQL query, a SELECT clause describe the data (triples) to be returned from the database and a WHERE clause specifies the graph pattern, which has to be satisfied while the query is processed to return the data. The query may include a group of the graph patterns.

In general, the processing of the query in the database may follow a path in response to the graph patterns (constraints). The processing requires execution to be performed by the nodes in the one or more graphs. The paths which match the constraints of the query are processed at the time of executing the nodes. The node from which the query may be executed is the node selected based on its priority in the priority queue. The node with a highest assigned priority is selected as the node for the execution. The processing of the query may be distributed across the nodes in the one or more graphs. The method generally includes generating an access plan element of a SQL fragment, based on the following steps: a) identifying the one or more paths across the one or more graphs; b) extracting data for one or more nodes traversed based on the navigated one or more paths; c) finding data corresponding to the nodes traversed; and d) rearranging the nodes in the priority queue after each navigation based on an updated priority of the nodes having an identifiable data corresponding to a variable component traversed.

The above process is repeated till the priority queue gets empty. On each navigation (iteration), the access plan element is generated. At the end of the process, a list of the access plan elements form the access plan for the given query.

The discussion will begin with a description of a method for translating the SPARQL query to the SQL query according to the embodiments described in details below. The method may query the relational database after efficiently converting the SPARQL query to the SQL query. Accordingly, various embodiments may implement a process in conjunction with the database to efficiently perform the SPARQL query conversion to the SQL query.

Figure 2:
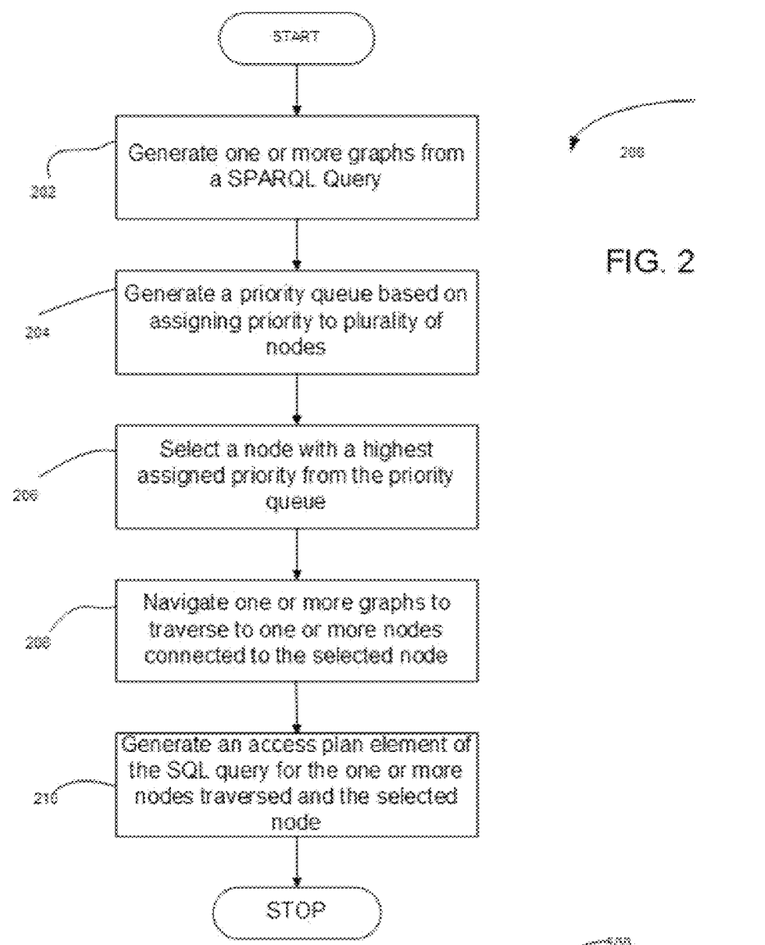
FIG. 2 illustrates an exemplary schematic flowchart depicting steps for translation of the SPARQL query to the SQL query according to one embodiment.

With reference now to FIG. 2, one embodiment provides a non-limiting mechanism for translating the SPARQL query into the native SQL query to expedite the triples access from the database.

The method comprises the following steps: in step 202, generating one or more graphs from the SPARQL query, the one or more graphs comprising a plurality of nodes; in step 204, assigning a priority to the plurality of nodes and generating a priority queue based on the assigned priority; in step 206, selecting the node having a highest assigned priority from the priority queue; in step 208, navigating the one or more graphs to traverse to one or more nodes of the plurality of nodes connected to the selected node; and in step 210, generating an access plan element of the SQL query for the one or more nodes traversed and the selected node. The access plan elements are the corresponding SQL fragments. The SQL query comprises of the SQL fragments.

At step 202, the one or more graphs may be generated based on the query received. The one or more graphs may be generated using any conventional manner known in the art, for example, adjacency matrix, adjacency list, etc. In one embodiment, the one or more generated graphs may have one of the following models: a basic graph, a group graph, an optional graph, or a union graph.

The query may be comprised of at least a graph pattern. The graph pattern may be a non-identical constraint to be distinctively satisfied. The graph patterns for the query define the corresponding model of the one or more generated graphs. In one embodiment, the one or more generated graphs may be joined or merged together based on use of join operators such as AND, UNION, and OPTIONAL specified by the graph patterns.

In one embodiment, the one or more generated graphs may have a hierarchical order between them. The hierarchical order between the one or more graphs may be dictated by the graph patterns of the query. The hierarchical order defines a scope of the one or more generated graphs. The scope between the one or more generated graphs may differ from one another. The scope may be matched to the order of the one or more generated graphs in the hierarchy. In the hierarchical set-up, a topmost graph may have a broader scope in comparison to the one or more other generated graphs lower in order. The scope between the sibling graphs may be equal.

The one or more generated graphs may contain a plurality of nodes. The plurality of nodes may describe data corresponding to the subject and the object of the respective triples stored in the database. In one example, the node may be the subject corresponding to the one triple or the object corresponding to the other triple. In one embodiment, the basic graph model may be defined as having at least the subject node connected with the object node through the predicate. In another embodiment, in the one or more generated graphs, there may be the plurality of nodes connected with one another through an association with one or more predicates. The predicate may be labeled as an edge. The edge may be further symbolized by an in-edge and an out-edge.

In one embodiment, a map may be created that contains, corresponding to the graph pattern components in the query, a match with the plurality of the nodes in the one or more generated graphs. The match describes data for the graph pattern components in the one or more generated graphs. In one embodiment, the map may include, corresponding to each variable graph pattern components in the query, a record reflecting a number of occurrences corresponding to the variable in the one or more generated graphs. Further, the map may record each instance of occurrence of the variable component in the one or more generated graphs. The map further record the hierarchical relationship between the one or more generated graphs containing the variable graph pattern component. The map may further records for each of the one or more generated graphs, information on the plurality of the nodes and the associated edges.

In the query, the graph pattern components may be described either as constant or variable components. The constant component of the graph pattern indicates that the data of the respective component in the database is known. The variable component in the graph pattern indicates that the data of the respective component in the database is yet unknown and is still to be determined. In one example, the data may comprise an URI, an IRI, a literal, a property, a relationship, or the variable.

In one embodiment, the record in the map may be updated when the data corresponding to the variable component of the graph pattern becomes identifiable.

In step 204, the plurality of nodes in the one or more generated graphs may be assigned a priority. The priority is assigned based on a criterion. The criterion may include one or more of the following: assigning a high priority to the node having the constant component in the graph pattern of the query and a low priority to the node having the variable component in the graph pattern of the query; assessing a scope for each instance of the node having multiple occurrences in the one or more generated graphs; and employing statistics to assign the priority between the one or more nodes having the constant component in the graph pattern of the query.

In one embodiment, a determination of whether the node may be assigned the high priority or the low priority may be ascertained from knowing the corresponding graph pattern component in the query. Where it is identified that the graph pattern component corresponding to the node is a constant, the high priority may be assigned to the node. Where the corresponding graph pattern component is a variable, the low priority may be assigned to the node.

In one embodiment, before the high priority may be assigned to the node having the graph pattern component as the constant, it may be further resolved whether the node has multiple occurrences in the one or more generated graphs. Where the node is found to have one occurrence, the high priority may be assigned. For the node with multiple occurrences in the one or more generated graphs, the scope of each instance of occurrence of the node in the one or more generated graphs may be established before the priority may be assigned to each instance of occurrence.

The scope of each instance of occurrence of the node is related to the order of hierarchy of the one or more generated graphs containing the respective occurrence of the node. The scope of each instance of the node in the one or more graphs may be resolved from knowing the hierarchy of the respective graph containing the node. The order of the hierarchy of the respective occurrence in the one or more generated graphs may be retrieved from the map.

Where it is determined that the respective instance of occurrence of the node is in the sibling graphs, the scope being the same for the respective occurrences, an equal priority may be assigned. Where it is determined for the node that the multiple occurrences in the one or more generated graphs, are arranged in the hierarchical order, the scope between the respective graphs being unmatched, the priority may be assigned consequently. For example, where it is determined that multiple occurrences are in the single/same graph, the scope being the same, an equal priority may be assigned for each instance. Where it is determined that the node may be both the subject and the object in the same graph, the scope may be different, and there may be an unequal priority assigned to the subject node and the object node.

For the nodes having the corresponding graph pattern component as a variable, a single priority which is the low priority may be assigned, notwithstanding the number of multiple occurrences.

In an embodiment, corresponding to the plurality of nodes having the constant component in the graph patterns, the priorities between the plurality of nodes may be differentiated based on employed statistics. From the statistics, a selectivity of each of the nodes may be decided. The statistics indicate the number of times the respective node appears in the database. If the statistics return a low frequency for the node in the database, the node may be considered to be a highly selective node and may be assigned a high priority in comparison to the node for which the statistics return a high frequency. The statistics of each of the nodes gets updated each time the respective nodes are changed/edited/added or updated in the database.

In one embodiment, the priority may be computed based on one or more of the criterion described above. The assigned priority may be pre-defined or machine generated. In an example, the priority may be an integer, where the integer varies from a min to a max value.

In step 204, after the priority is assigned to the plurality of the nodes, a priority queue may be generated. The priority queue may comprise the assigned priorities of the plurality of the nodes.

The plurality of the nodes based on the assigned priorities may have a corresponding one instance of representation in the priority queue. In one embodiment, corresponding to the nodes with multiple occurrences (having constant component) and where the scope of the respective occurrence is determined as unmatched, there may be one representation corresponding to the respective occurrences of the node in the priority queue. In another embodiment, since a same priority is assigned to the nodes with the variable component and multiple occurrences, there may be one representation, notwithstanding the number of occurrences of that node, in the priority queue.

In one embodiment, in the priority queue, the plurality of nodes may be arranged in a hierarchical order. The node with the highest assigned priority may be the top most node in the priority queue.

In step 206, the node with the highest assigned priority is identified as the node, which may be selected from the priority queue.

In step 208, processing of the query may begin in the graph having the selected node. From the selected node, a path to be navigated may be ascertained. The path may provide for navigation to the one or more nodes connected with the selected node.

In an embodiment, corresponding to the selected node, the one or more generated graphs to be navigated to traverse to the one or more nodes connected with the selected node is ascertained from identifying the in-edges and the out-edges associated with the selected node.

In one embodiment, the path may be traversed from the selected node using either the in-edges or the out-edges associated with the selected node in the one or more generated graphs to traverse to the one or more connected nodes.

In some cases, corresponding to the selected node having multiple occurrences, a count of the in-edges and the out-edges may be cumulatively calculated by aggregating the counts corresponding to the respective occurrences. The count of the in-edges and the out edges associated with the selected node in the one or more generated graphs may be traced from the map. Based on the count of the in-edges or the out-edges, whichever count is more, either the in-edges or the out-edges are taken as the chosen set of edges identified for navigation from the selected node. The path to be navigated may follow the selected node, and the associated edges to traverse to the one or more connected nodes in the one or more generated graphs.

In one embodiment, on starting from the selected node and associating with the one or more identified edges, the path may be navigated to reach the one or more nodes connected with the selected node. The associated edges may be navigated either one after the other or simultaneously from the selected node to reach the one or more nodes connecting with the selected node in the one or more generated graphs. In one embodiment, the navigation to the one or more nodes from the selected node may begin randomly from any of the one or more graphs which include the selected node. In another embodiment, the navigation may begin simultaneously from each of the respective occurrences of the selected node in the one or more generated graphs. In one example, the reached nodes may be termed as destination nodes.

Once the path is navigated from the selected node to traverse to the one or more connected nodes, data of the respective reached nodes becomes identifiable and the corresponding relationship between the selected node and the one or more connected nodes becomes established. The navigation from the selected node is complete. In one example, the selected node may be the subject node and the reached node may be the object node in the database.

In one embodiment, wherein the one or more reached nodes have a corresponding variable component in the query, the data of such reached nodes may be read from the database. The identified data of the one or more reached nodes may be substituted against the respective matching variable components in the map. In one embodiment, where, in the map, the one or more reached nodes are also found to have multiple occurrences, then each such occurrence of the respective one or more reached nodes may be substituted with the identifiable data of the reached node.

In one embodiment, the map may be updated to indicate the path navigated from the selected node, the associated edges, and the one or more nodes connected with the selected node in the one or more graphs.

At step 210, as soon as the navigation process which followed from the selected node and traversed to the one or more nodes connected with the selected node is complete, an access plan element may be generated. The access plan element may include the data corresponding to the selected node, the one or more reached nodes, and the associated edges. The access plan element may be used as the data of a corresponding SQL fragment.

In one embodiment, where the data corresponding to the one or more reached nodes having the variable component got identified on navigation, a high priority may be assigned to each of such one or more reached nodes. The reassigned priority of the one or more reached nodes may be updated in the priority queue. In one embodiment, the order of the plurality of the nodes in the priority queue may change. In one embodiment, the priority queue, being dynamic may automatically rearrange the order of the plurality of the nodes once the priorities are updated in the priority queue.

The query processing may continue with selecting another node among the plurality of the nodes for navigating one after the other. In one embodiment, the navigation may begin each time by selecting the node which is the top most node in the priority queue. In another embodiment, the navigation may begin each time by selecting the node from the priority queue having the highest assigned priority. The query execution may proceed with the node having the highest assigned priority in the priority queue.

Correspondingly, where at the end of each navigation process, it is determined that the data of the one or more reached nodes with the variable component has become identifiable, the high priority may be reassigned to the respective one or more reached nodes. Further, the priority queue may be rearranged based on updating the priorities of the one or more reached nodes which got identified on the navigation.

The above steps are repeated until the plurality of nodes in the priority queue got processed for the execution of the query. Each navigation from the selected node results in satisfying the one or more constraints in the graph pattern of the query.

In one embodiment, the access plan may be generated at the completion of the execution of processing from the plurality of the nodes. The access plan may comprise an array of the access plan elements. The access plan elements which are generated at the end of the navigation from the selected node may be appended to the access plan. The access plan elements may get arranged in the order in which they may be generated. In one embodiment, the access plan may be further employed by the SQL engine to access the data stored in the database. The access plan gives a sequence of the corresponding SQL fragments which may be used for translation into the SQL query. The access plan may provide an efficient path for the SQL query engine to navigate in the database.

In one embodiment, the database engine (for example, SQL engine) may use the data from the generated access plan for navigating through the database. The operation by the SQL engine may result in the generation of the SQL statement for application to the database. The SQL engine may traverse through the one or more edges simultaneously across the one or more graphs to generate the data as a solution which may comply with the query's graph patterns (constraints). This may lead to reducing a time required for processing the query, while being translated from the SPARQL query to the corresponding SQL query.

Figure 3A:
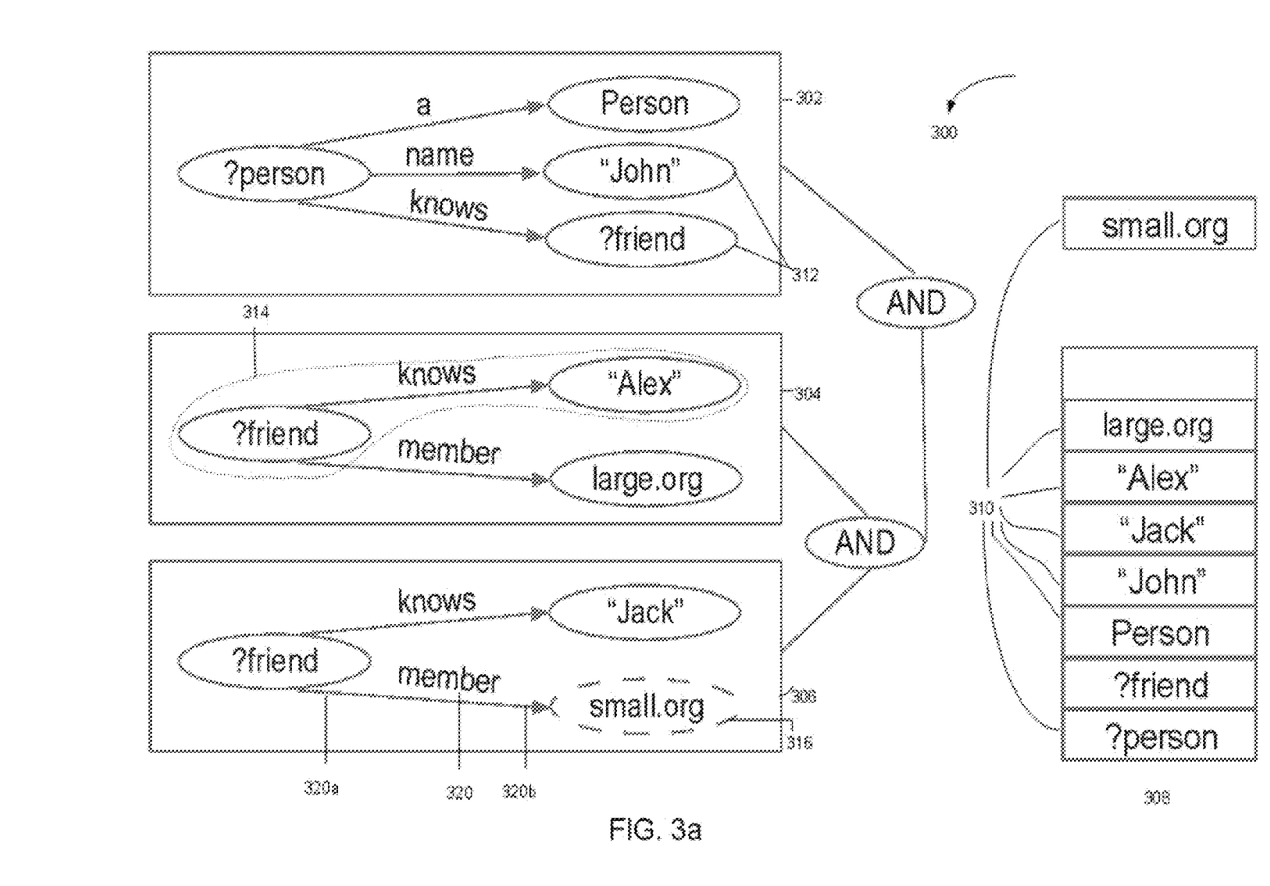
FIGS. 3a-3c illustrate an example of the query processing according to one embodiment.
Figure 3B:
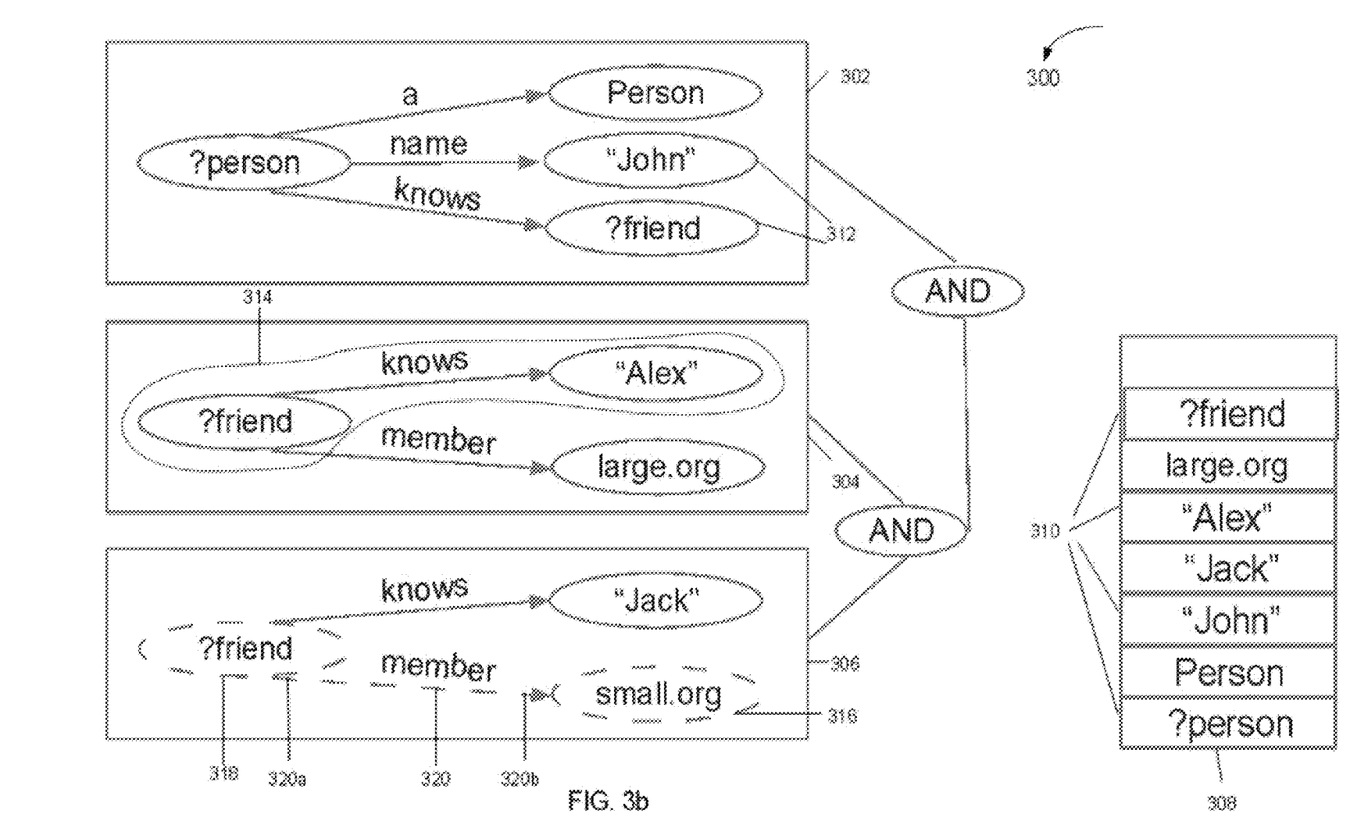
Figure 3C:
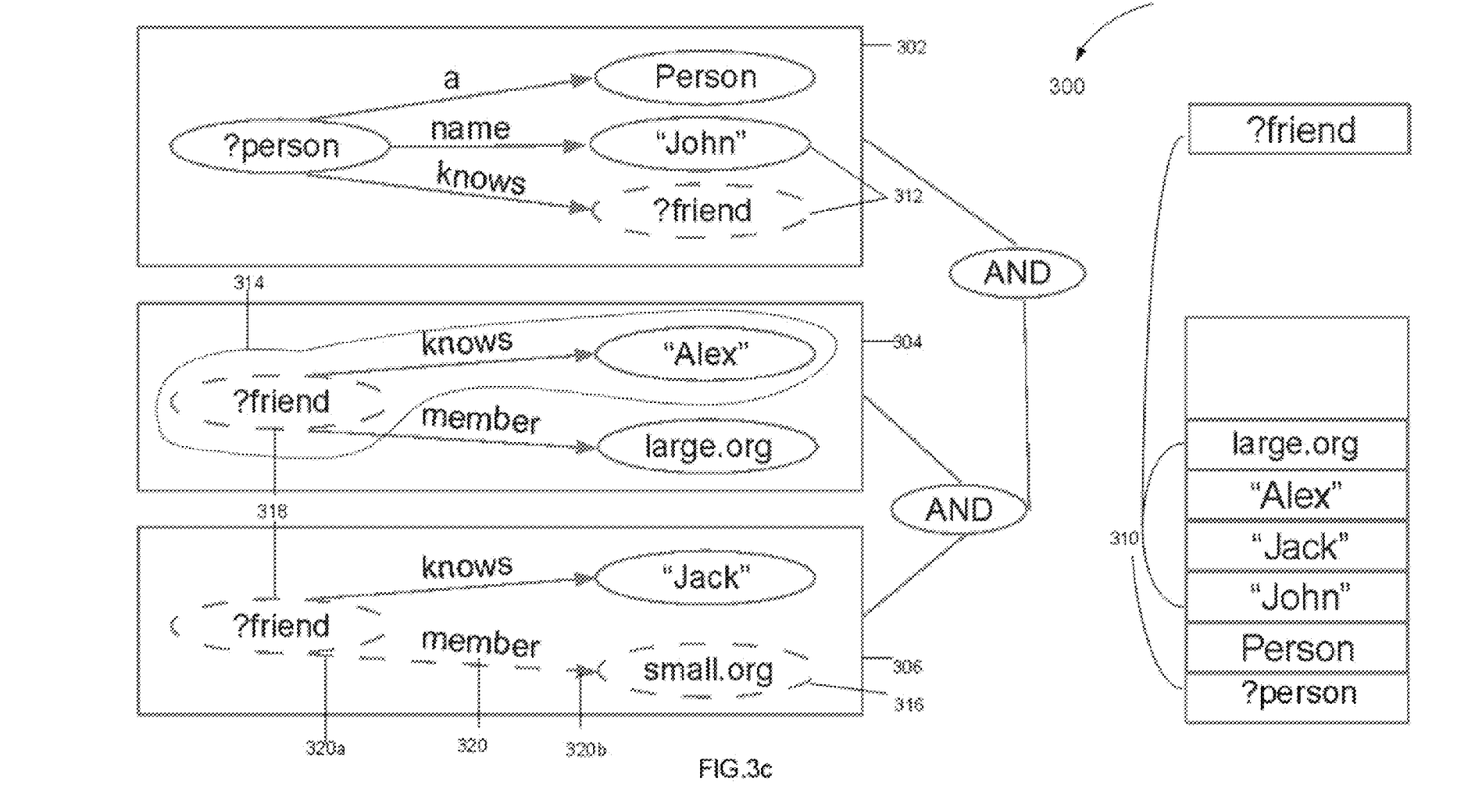

The process of navigation in the one or more generated graphs may be described with the help of FIGS. 3a-3c. The following example of the SPARQL query as illustrated in Table 1 will be taken as a running example throughout to explain the process.

TABLE 1

```
PREFIX foaf: <http://xmlns.com/foaf/0.1/>
SELECT ?friend
    WHERE
    {
1   ?person a foaf:Person .
2   ?person foaf:name "John" .
3   ?person foaf:knows ?friend .
    {
4       ?friend foaf:knows "Alex" .
5       ?friend foaf:member <http://large.org> .
    }
    {
6       ?friend foaf:knows "Jack" .
7       ?friend foaf:member <http://small.org> .
    }
    }
```

It is shown in Table 1 that there are seven graph patterns defining the query which have to be satisfied while generating the data from the database. The graph patterns are numbered from (1)-(7) for ease of description and such numbers don't exist in the real query.

As the graph pattern is expressed in the form of <subject, predicate, object>, a question mark before <subject, predicate, object> indicates a respective variable component, for which a corresponding data in the database is yet to be determined. The above listed SPARQL query, includes a SELECT clause and a WHERE clause.

The SELECT statement is the query asking for the names of all friends of "John" such that they know "Alex" in large.org and "Jack" in small.org.

The WHERE clause includes set of braces { } which specify constraints that the group of graph patterns should satisfy for the result "friend". The braces { } define the group of graph patterns which may join together to indicate a specific relationship between them to satisfy the query. The braces { } may further define a hierarchical relation between the one or more generated graphs.

Referring to Table 1 above, a few of the graph patterns are explained below. For example, line 7 is a query for a variable ?friend (subject) who is foaf:member (predicate) of http://small.org (object). In Line 7, "?" before friend indicates that ?friend is a variable component, data of which is yet to be ascertained. Likewise, http://small.org indicates the object with a constant component, the data of which is known.

Similarly, line 6 graph pattern queries for a ? friend (subject) who foaf:knows (predicate) "Jack" (object). Similarly line 5 queries the ?friend (subject) who is a foaf:member (predicate) http://large.org (object).

Results achieved for the ?friend will meet the constraints imposed in the query. After each of the graph patterns have been mapped with the data stored in the database and substituted for the respective variable components of the graph patterns of the query, the result is a solution equivalent of the query having a filtered data for the ?friend.

FIGS. 3a, 3b, and 3c illustrate the block diagrams exhibiting processing of the query from the plurality of the nodes in the one or more generated graphs, according to an embodiment. FIG. 3a illustrates a method 300 to select a node among the plurality of the nodes in the one or more generated graphs for executing the query. FIG. 3a further illustrates the plurality of nodes arranged in a hierarchy in the priority queue. FIG. 3b illustrates, an efficient navigation path executed from the selected node to traverse to the one or more connected nodes. FIG. 3b further displays a change in order of the plurality of the nodes in the priority queue. FIG. 3c illustrates continuation of the navigation process to begin from any of the one or more generated graphs for the node having multiple occurrences.

In FIG. 3a, in one embodiment, when the SPARQL query is processed, the one or more graphs 314 are generated. FIG. 3a illustrates an example of one of the one or more graphs 314, shown as dotted lines. The graph 314 comprises a plurality of nodes 312, which are connected with one another through an associated edge 320.

In one embodiment, the one or more generated graphs 314 may be aggregated as one or more blocks. The braces { } defined in the graph pattern of the query, result in the one or more generated graphs 314 being aggregated as the blocks, such as block 302, block 304 and block 306.

In one embodiment, the one or more blocks (302, 304, and 306) may join with one another to illustrate a hierarchical order between the one or more generated graphs 314. The hierarchical order between the one or more generated graphs 314 may be the result of the one or more operators such as AND, OR, OPTIONAL, which may be part of the query. In one example illustration, the block 304 and the block 306 are combined by the AND operator, and the block 302 is combined by the AND operator to a result of the AND operation between the blocks 304 and 306.

In FIG. 3a, each of the generated graphs 314 being the set of triples, comprising the subject, the predicate and the object is illustrated. The subject and the object (plurality of nodes 312) are shown as the oval shaped nodes.

The terms predicate and edge may be used alternately. FIG. 3a shows predicate (edge) 320 depicted by an arrow. The edge 320 may be further construed as the in-edge 320b and the out-edge 320a. The in-edge 320b is a head of the arrow and the out-edge 320a is a tail of the arrow. In one example, the subject node may be connected with the object node through the edge 320 such that subject node may be associated with the out-edge 320a (tail of the arrow) and the object node may be associated with the in-edge 320b of the same edge (head of the arrow) while forming the connection between the two respective nodes 312.

In block 302, the one or more generated graphs 314 are comprised of the plurality of nodes 312 (identified as ?person, Person, "John", ?friend), connected with one another through the predicates (edges) 320. In one embodiment, the nodes 312 (?person, Person, "John", ?friend) may represent one of the subject node and the object node, connected with one another through predicates (edges) 320, indicated with arrows. In an example, ?person may be a common subject node querying for a Person (object), who has a name "John" (object), and knows ?friend (object). Words in italics represent predicates (edges) 320.

The block 304 includes the one or more graphs 314 comprising the plurality of nodes 312 (identified as ?friend, "Alex", large.org). The plurality of nodes 312 (?friend, "Alex", large.org) may be one of the subject node and/or the object node. In one example, ?friend is a common node, querying for a ?friend (subject) knows (predicate) "Alex" (object), and member (predicate) of large.org (object).

The block 306 includes the one or more graphs 314 comprising the plurality of nodes 312 (identified as ?friend, "Jack", small.org). In one example, ?friend is a common node. ?friend (subject) is (predicate) querying for, "Jack" (object) who is member (predicate) of small.org (object).

FIG. 3a further illustrates the plurality of nodes 310 arranged in a priority queue container 308. In one embodiment, the priorities may be assigned to the plurality of nodes 310 before being added to the priority queue container 308. In one embodiment, the priorities of the plurality of nodes 310 may be computed while the priority queue container 310 is being generated. In one embodiment, the plurality of nodes 310 may be arranged in the priority queue container 308 in a hierarchical order. In one embodiment, the priority queue container 308 may include data of the plurality of the nodes 310, as described in the query (not shown).

In one embodiment, the order in which the plurality of nodes 310 may be arranged in the priority queue container 308 may be decided from the priority assigned to the respective plurality of nodes 310. In the illustrated example, small.org being the topmost node, may have the highest assigned priority, and ?person node, being shown as the last node, may have the lowest assigned priority, in the priority queue container 308.

In one embodiment, there may be a single instance of representation of the plurality of nodes 310 in the priority queue container 308. Even corresponding to the nodes having multiple occurrences in the one or more generated graphs, if the scope of the one or more occurrences is the same, there may be a single instance of representation in the priority queue container 308. Even corresponding to the nodes having the variable component, notwithstanding the number of occurrences, there is a single instance of representation of the nodes in the priority queue container 310. In one example, as shown in FIG. 3a, ?friend occurs in the blocks 302, 304, and 306 respectively, however, there is one representation of the ?friend node in the priority queue container 308.

It may be further noted from FIG. 3a, that small.org node is shown as pulled away from the priority queue container 308. This is to illustrate that small.org is the node with the highest assigned priority and may therefore become entitled to represent itself as the node to be selected in the graph, from which the processing of the query, may start to reach the one or more nodes in the one or more generated graphs 314 connected with the selected node.

It is further shown in the blocks 302, 304, and 306, that the plurality of nodes 312 are shown as solid nodes and the edges (arrows) 320 are shown by solid lines. This may imply that the processing of the query from the respective plurality of the nodes 312 is yet to be executed. It may be however noted in the example illustration, that small.org node 316 in the block 306 is shown as dashed node. This is to indicate that processing of the query may start from the small.org node 316, which has been selected as the node with the highest assigned priority among the plurality of the nodes in the priority queue container 308.

FIG. 3b exemplifies that once the navigation process begins from the selected node in the one or more generated graphs 314, it may follow the path from the associated edges 320 to reach the one or more nodes connected with the selected node.

In the illustrated example, small.org node 316 in block 306 is shown as dashed node to indicate it as the node selected for starting the execution of the query processing. It may be further noted that predicate 'member' 320 is the edge associated with small.org node 316. The processing may begin from the node small.org 316 to navigate through the associated member predicate (edge) 320, to reach the connected node which is ?friend 318. The navigation path between the selected node small.org 316 and the reached node ?friend is shown by dashed lines.

As the traversed node is shown as ?friend 318, it may imply that the data corresponding to ?friend 318 may be now identifiable from the database. Once the data for the ?friend 318 has become known, a high priority may be reassigned to ?friend node and updated in the priority queue container 310. Further, based on the reassigned priority to ?friend node, hierarchy of the plurality of the nodes 310 in the priority queue container 310 may rearrange. From FIG. 3b, it may be observed that the ?friend node is the next top most node in the hierarchy of plurality of the nodes 310 in the priority queue container 308.

FIG. 3c illustrates the continuation of the navigation process. ?friend, being the top most node in the priority queue container 308, is the next node to get selected from which the query process may continue in the one or more generated graphs 314. It is further noted that ?friend 318 has one occurrence each in blocks 302, 304, and 306 respectively. Though the ?friend has single instance of representation in the priority queue container 308, still the information on the multiple occurrences in the one or more graphs 314 corresponding to the ?friend node 318 are retrieved from the map (not shown). Each of the occurrences of the ?friend node 318 in the respective blocks are highlighted as dashed nodes to show multiple occurrences. The multiple occurrences indicate that the navigation process may progress by selecting any or all of the one or more of the ?friend nodes 318 (blocks 302, 304, 306), either one after the other or simultaneously for the execution to proceed.

In one embodiment, before the processing continues from the ?friend node 318 in the one or more graphs 314, the path to be followed is determined from knowing the number of the in-edges 320b and the out-edges 320a that ?friend node 318 may have in each of the respective blocks (302, 304, 306). The path may follow either the in-edges 320b (head of the arrows) or the out-edges 320a (tail of the arrows). In block 302, the ?friend node 318 is associated with one in-edge 320b. In block 304, ?friend node 318 is associated with two out-edges 320. In block 306, ?friend node 318 is again associated with two out-edges 320a, of which one edge is already traversed while small.org node 316 was processed and is shown with dashed lines. Therefore, corresponding to ?friend node 318 having three occurrences (each in block 302, 304 and 306), the number of the out-edges 320a is counted as three (block 304 and block 306), with there being one in-edge 320b (block 302). The count of the out-edges 320a of the ?friend node 318 is more than the count of the in-edge 320b, therefore, the path chosen will be followed from associating the out-edges 320a with the selected ?friend node 318.

In one embodiment, since the block 304 and the block 306 each respectively contains ? friend node 318, the processing from the ?friend node 318 may begin either from the block 304 and/or the block 306 randomly to reach the one or more connected nodes (not shown). In the embodiment, the processing may continue simultaneously from the selected ?friend node 318 (in the blocks 304 and 306, respectively) to navigate through the associated out-edges 320a in the one or more generated graphs 314 (not shown).

In one embodiment, the navigation in the respective graphs 314 (in block 304 and block 306) may either follow one edge 320 (at a time) to traverse to the connected node. In another embodiment, the navigation in the respective graphs 314 may proceed on joining all the associated edges 320 to traverse simultaneously to the one or more connected nodes. In yet another embodiment, the navigation may associate the identified edges 320 in the one or more graphs 314 to traverse simultaneously from the respective selected node to reach the one or more connected nodes.

The process of execution from the plurality of the nodes continues until each of the plurality of nodes 310 in the priority queue container 308 have been selected for processing the query to satisfy the graph pattern constraints.

In one non-limiting example, when the plurality of the nodes 310 selected from the priority queue container 308 have been processed in the one or more generated graphs 314, the access plan is generated. Table 2 is an unrestrictive example of the access plan meant for illustration only.

TABLE 2

| | PREFIX foaf: <http://xmlns.com/foaf/0.1/> SELECT ?friend WHERE { | |
|---|---|---|
| 1 | ?person a foaf:Person . | -- 5 |
| 2 | ?person foaf:name "John" . | -- 5 |
| 3 | ?person foaf:knows ?friend . { | -- 4 |
| 4 | ?friend foaf:knows "Alex" . | -- 2 |
| 5 | ?friend foaf:member <http://large.org> . } { | -- 2 |
| 6 | ?friend foaf:knows "Jack" . | --3 |
| 7 | ?friend foaf:member <http://small.org> . } } | -- 1 |

As may be observed from Table 2, the generated access plan comprises the array the access plan elements. The access plan elements are generated after the end of each navigation process. The generated access plan element is appended as the array to the access plan. It may be noted that, corresponding to the generated access plan elements, there are strings of numerals varying from 1-5. The strings may be a potential path which may be followed by the SQL engine for expediting the retrieval of filtered data from the database. In the example, line 7 may be the first node from where the SQL engine may start navigating in the database. Lines 4 and 5 are shown with numerals as 2. This is to indicate that the next navigation may start from the graph containing ?friend node. Further, the numeral 2 is mentioned twice, to indicate that the respective graphs as in lines 4 and 5, may be navigated simultaneously from the selected node.

In one representation, the processing may begin from all the nodes (in sequence 1-5) simultaneously, where the data may be merged and filtered based on the joining order as described.

In the following section an architecture is described for executing the queries over a database according to embodiments herein described.

The various embodiments implementing the method have been described above with respect to the accompanying drawings. Those skilled in the art may understand that the method may be implemented in software, hardware or combinations of software and hardware. Moreover, those skilled in the art may understand that by implementing in the above method in software, hardware or combinations of software and hardware, there may be provided a System for querying the database, according to an embodiment.

Figure 4:
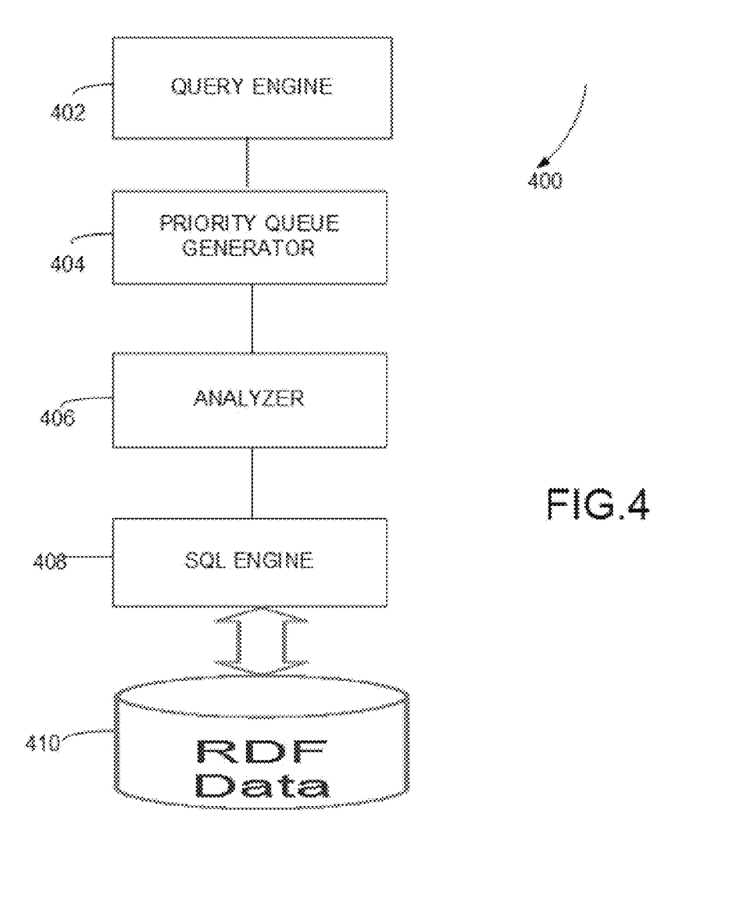
FIG. 4 illustrates an exemplary schematic structural diagram of an apparatus for translating the SPARQL queries to the SQL queries according to one embodiment.

Accordingly, in FIG. 4 an embodiment provides an apparatus 400 for translating the SPARQL queries into the SQL queries. The apparatus 400 may be implemented in the existing database for efficiently navigating the database by expeditiously retrieving data. The apparatus 400 may provide a computer infrastructure comprising of one or more components, configured to perform one or more of the following: to generate one or more graphs from the SPARQL query; to assign a priority to the plurality of nodes and generate a priority queue based on the assigned priority; to select the node having a highest assigned priority from the priority queue; to navigate the one or more graphs to traverse to one or more said nodes of the plurality of nodes connected to the selected node; and to generate an access plan element of the SQL query for the one or more nodes traversed and the selected node.

The apparatus 400 generally comprises a query engine 402 configured to generate one or more graphs based on processing the SPARQL query. The query engine 402 may be configured to receive the query. In one example, the query may be in SPARQL query language format. In one embodiment, the query engine 402 may be configured to parse the received query into a text, which can be translated to generate the one or more graphs. In another embodiment, the query engine may be configured to include a parser to read the query text. The parser may further communicate with a graph generator to read the parsed text and then translate the parsed text to generate the one or more graphs (not shown).

In one embodiment, the one or more generated graphs may be generated using a process known in the art. In one embodiment, the one or more generated graphs may include the plurality of nodes connected with one another through the one or more associated edges.

In one embodiment, the apparatus 400 may further comprise an analyzer 406. The query engine 402 may be configured to communicate with the analyzer 406 to process the queries through the one or more generated graphs. The analyzer 402 may be configured to analyze the received one or more graphs generated by the query engine 402. The analyzer 406 may be configured to execute the queries on navigating through the one or more generated graphs. The analyzer 406 may be further configured to generate an access plan for further use by an SQL engine 408, based on the execution of the query.

In one embodiment, the analyzer 406 may be a software application or a hardware component or a combination of hardware and software, executing on the server (FIG. 1).

In one embodiment, based on the communication between the analyzer 406 and the query engine 402, the analyzer 406 may build a map containing a record of the one or more generated graphs and the corresponding graph pattern components of the query. The map may also include the association between the triples in the one or more generated graphs. The map may include the record of the hierarchy of the one or more generated graphs. The map may also include the record of a joining relationship between the one or more generated graphs. The analyzer 406 may be configured to further edit/update the record based on navigating through the one or more generated graphs while executing the queries.

In one embodiment, the analyzer 406 may be configured to process the query by executing the query on the plurality of the nodes one after the other in the one or more generated graphs. In one embodiment, the analyzer 406 may be configured to start executing the query from the node having a highest assigned priority, while progressing through the execution of the query in the one or more generated graphs.

In one embodiment, the analyzer 406, before making headway to processing the query by selecting the node for query execution, may be configured to assign the priorities to the plurality of the nodes in the one or more generated graphs. The analyzer 406 may be configured to assign the priorities to each of the plurality of nodes based from verifying the corresponding graph pattern component in the query, from the map. The analyzer 406 may determine for the node, whether the corresponding graph pattern component in the query represents the constant or the variable component. The analyzer 406 may be configured to assign the high priority to the node having the constant and the low priority to the node having the variable component.

In one embodiment, where the analyzer 406 determines that the node represents the constant component, the analyzer 406 may further compute a scope of the node based on knowing the number of occurrences of the node in the one or more generated graphs. The analyzer 406 may be further configured to determine the scope corresponding to each occurrence of the node in the one or more generated graphs. The analyzer 406 may be configured to resolve the scope of the node corresponding to the multiple occurrences, from knowing the hierarchy of the one or more graphs containing the respective instance of occurrence of the node. The analyzer 406 may be configured to retrieve the record of the respective occurrence of the node in the one or more graphs generated from the map.

In one embodiment, the analyzer 406 may utilize statistics to assign the priority to the plurality of the nodes occurring in the one or more generated graphs. The analyzer 406 may assign the high priority to the node which is highly selective node as per statistics and may assign the low priority to the node which is less selective node as per statistics.

In one embodiment, the analyzer 406 may consider the statistics and the scope before assigning the priority to the plurality of the nodes. In one embodiment, the priorities to be assigned may be predefined or may be dynamically computed.

In one embodiment, once the analyzer 406 has assigned the priorities to the respective nodes, the analyzer 406 may communicate with a priority queue generator 404 to generate the priority queue for the plurality of nodes based on their assigned priorities. The priority queue generator 404 may maintain a log of the assigned priorities to the nodes in the priority queue container (310 as described in FIGS. 3a-3c). In one embodiment, the priority queue generator 404 may arrange the plurality of nodes in the priority queue container (310) based on the assigned priorities. In one embodiment, the priority queue generator 404 may arrange the plurality of nodes in the hierarchy such that the node with the highest assigned priority may be the top most node and the node with the lowest assigned priority may be last in order in the priority queue. In one embodiment, the analyzer 406 may itself be configured to generate the priority queue container (310).

In one embodiment, the analyzer 406 may be configured to communicate with the priority queue generator 404 to figure out the node having the highest assigned priority in the priority queue container (310). Once the analyzer 406 selects the node with the highest assigned priority, the analyzer 406 may be further configured to initiate the execution of query process for navigating through the one or more generated graphs based on the selected node.

In one embodiment, the analyzer 406 may retrieve the record of the selected node to decipher whether the selected node has multiple occurrences in the one or more generated graphs, from the map. The analyzer 406, based on knowing the number of occurrences of the selected node, may be further configured to identify the one or more edges associated with the selected node. The analyzer may determine the one or more associated edges of the selected node from the map. The analyzer 406 may follow the associated edges of the selected node to reach the one or more nodes connected with the selected node. Once the path is traversed from the selected node to navigate to the one or more connected nodes, the analyzer 406 may be configured to generate an access plan element corresponding to the path followed from the selected node to reach the one or more connected nodes. In one embodiment, the analyzer 406 may be configured to append the generated access plan element at the end of the navigation process to the access plan being generated alongside.

In one implementation, the analyzer 406 may be further configured to determine whether the reached node has a corresponding variable component (in the query) from the map. Following the determination by the analyzer 406 that the reached node has an identifiable variable, the analyzer 406 may be configured to substitute data from the database corresponding to the identifiable variable in the map. The analyzer 404 may be further configured to reassign the high priority to the node having the identifiable variable. In one embodiment, the analyzer 406 may further communicate with the priority queue generator 404 to update the reassigned priority corresponding to the node having the identifiable variable in the priority queue container (310).

In one embodiment, the priority queue generator 404 may be configured to rearrange the order of the plurality of nodes in the priority queue container (310) based on the reassigned priority.

In one embodiment, for subsequent processing of the query, the analyzer 406 may communicate with priority queue generator 404 to figure out on the node with the highest assigned priority in the priority queue container (310) to decide the next node to be selected for continuing the execution process, based on the assigned priority. The analyzer 406 may go on communicating with the priority queue generator 404 until all the plurality of the nodes in the priority queue container (310) has been selected for the navigation.

In one embodiment, once the access plan is generated, the analyzer 404 may be configured to communicate with an SQL engine 410. The SQL engine 410, may be configured to translate the SPARQL query into the SQL query, by using the data as defined in the access plan. The SQL engine 410 may follow the path which can be inferred from the array of access plan elements for navigating the database.

The implementation details of the above apparatus embodiments may reference the corresponding method embodiments which are not detailed here. Moreover, the above apparatus embodiments may reference each other and combine together, thereby obtaining more embodiments.

Figure 5:
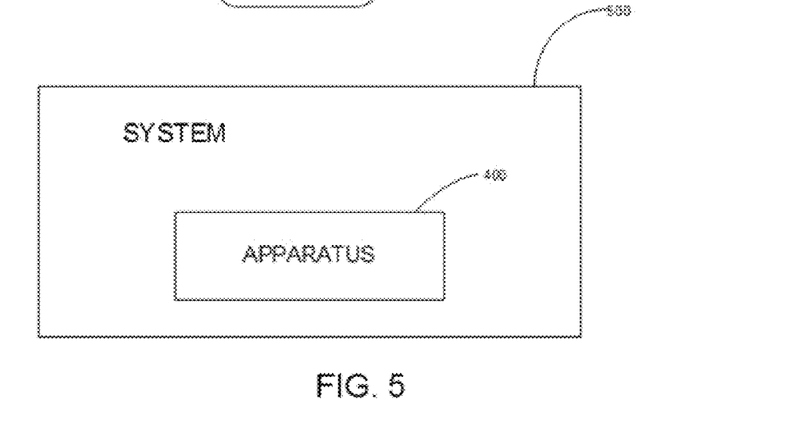
FIG. 5 illustrates an exemplary schematic structural diagram of a translation system according to one embodiment.

As shown in FIG. 5, the embodiments provide an efficient SQL translation system 500. The system 500 comprises apparatus 400 for translation as shown in FIG. 4.

The description of the various embodiments have been provided for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over technologies found in the marketplace, or to enable others of ordinary skill in the art to understand the embodiments disclosed herein.

What is claimed is:

1. A method of translating a Simple Protocol and RDF Query Language (SPARQL) query into a Structured Query Language (SQL) query, the method comprising:
   generating one or more graphs from the SPARQL query, wherein the one or more graphs comprise a plurality of nodes;
   assigning a priority to each of the plurality of nodes and generating a priority queue based on the assigned priority;
   selecting the node having a highest assigned priority from the priority queue;
   navigating the one or more graphs to traverse to one or more reached nodes of the plurality of nodes connected to the selected node, comprising:
      identifying data corresponding to the one or more reached nodes;
      for each reached node having a variable component, updating the priority of the reached node based on the identified data for the reached node; and
      updating an order of the plurality of nodes in the priority queue based on the updated priorities;
   generating an access plan element of the SQL query for the one or more reached nodes traversed and the selected node;
   repeating the selecting of the node having the highest assigned priority from the priority queue, the navigating of the one or more graphs to traverse to the one or more reached nodes, and the generating of the access plan element of the SQL query until the priority queue is empty; and
   generating an access plan for the SQL query comprising the access plan elements generated for the plurality of nodes.

2. The method of claim 1, wherein at least two of the plurality of nodes are connected with one another through an edge, wherein navigating the one or more graphs to traverse to the one or more reached nodes connected to the selected node comprises:
   identifying the one or more edges associated with the selected node in the one or more graphs; and
   navigating the one or more graphs to reach the one or more reached nodes connected to the selected node through the one or more associated edges.

3. The method of claim 2, wherein the one or more graphs are navigated simultaneously through the one or more associated edges to reach the one or more reached nodes connected to the selected node.

4. The method of claim 2, wherein the selected node has multiple occurrences in the one or more graphs, wherein the navigating of the one or more graphs further comprises:
   determining a first count of in-edges and a second count of out-edges of the selected node; and
   based on a higher of the first count and the second count, choosing either the in-edges or the out-edges for navigating from the selected node to one or more reached nodes.

5. The method of claim 1, wherein the assigning of the priority to each of the plurality of nodes comprises:
   determining a given node of the plurality of nodes has a constant component;
   determining statistics indicating a number of times the given node appears in a database;
   when the statistics return a low frequency for the given node, assigning the given node a high priority in comparison to nodes for which the statistics return a high frequency; and
   when the statistics return the high frequency for the given node, assigning the given node a low priority in comparison to nodes for which the statistics return the low frequency.

6. The method of claim 1, wherein the assigning of the priority to each of the plurality of nodes comprises:
   determining whether a given node of the plurality of nodes comprise a constant component or a variable component;
   when the given node is determined to comprise the constant component, the assigning comprises:
      determining whether the given node of the plurality of nodes has multiple occurrences in the one or more graphs;
      when the given node does not have multiple occurrences, assigning to the given node a high priority in comparison to nodes having multiple occurrences;
      when the given node has multiple occurrences, the assigning comprises:
         determining a scope of each instance of the given node based on an order of a hierarchy of the one or more graphs containing the instances of the given node;
         for instances of occurrence of the given node having a matching scope in sibling graphs of the one or more graphs, assigning the instances of the given node equal priorities; and
         for instances of occurrence of the given node having an unmatched scope in the sibling graphs, assigning the instances of the given node unequal priorities; and
   when the given node comprises the variable component, assigning a low priority to the given node in comparison to nodes comprising the constant component.

7. A computer program product for translating a Simple Protocol and RDF Query Language (SPARQL) query into a Structured Query Language (SQL) query, the computer program product comprising a computer readable storage medium having program instructions embodied therewith, wherein the computer readable storage medium is not a transitory signal per se, the program instructions executable by a processor to cause the processor to perform a method comprising:

generating one or more graphs from the SPARQL query, wherein the one or more graphs comprise a plurality of nodes;

assigning a priority to each of the plurality of nodes and generate a priority queue based on the assigned priority;

selecting the node having a highest assigned priority from the priority queue;

navigating the one or more graphs to traverse to one or more reached nodes of the plurality of nodes connected to the selected node, comprising:

identifying data corresponding to the one or more reached nodes;

for each reached node having a variable component, updating the priority of the reached node based on the identified data for the reached node; and         updating an order of the plurality of nodes in the priority queue based on the updated priorities;

generating an access plan element of the SQL query for the one or more reached nodes traversed and the selected node;

repeating the selecting of the node having the highest assigned priority from the priority queue, the navigating of the one or more graphs to traverse to the one or more reached nodes, and the generating of the access plan element of the SQL query until the priority queue is empty; and     generating an access plan for the SQL query comprising the access plan elements generated for the plurality of nodes.

8. The computer program product of claim 7, wherein at least two of the plurality of nodes are connected with one another through an edge, wherein navigating the one or more graphs to traverse to the one or more reached nodes connected to the selected node comprises:

identifying the one or more edges associated with the selected node in the one or more graphs; and     navigating the one or more graphs to reach the one or more reached nodes connected to the selected node through the one or more associated edges.

9. The computer program product of claim 8, wherein the one or more graphs are navigated simultaneously through the one or more associated edges to reach the one or more reached nodes connected to the selected node.

10. The computer program product of claim 8, wherein the selected node has multiple occurrences in the one or more graphs, wherein the navigating of the one or more graphs further comprises:

determining a first count of in-edges and a second count of out-edges of the selected node; and     based on a higher of the first count and the second count, choosing either the in-edges or the out-edges for navigating from the selected node to one or more reached nodes.

11. The computer program product of claim 7, wherein the assigning of the priority to each of the plurality of nodes comprises:

determining a given node of the plurality of nodes has a constant component;

determining statistics indicating a number of times the given node appears in a database;

when the statistics return a low frequency for the given node, assigning the given node a high priority in comparison to nodes for which the statistics return a high frequency; and     when the statistics return the high frequency for the given node, assigning the given node a low priority in comparison to nodes for which the statistics return the low frequency.

12. The computer program product of claim 7, wherein the assigning of the priority to each of the plurality of nodes comprises:

determining whether a given node of the plurality of nodes comprise a constant component or a variable component;

when the given node is determined to comprise the constant component, the assigning comprises:

determining whether the given node of the plurality of nodes has multiple occurrences in the one or more graphs;

when the given node does not have multiple occurrences, assigning to the given node a high priority in comparison to nodes having multiple occurrences;

when the given node has multiple occurrences, the assigning comprises:

determining a scope of each instance of the given node based on an order of a hierarchy of the one or more graphs containing the instances of the given node;

for instances of occurrence of the given node having a matching scope in sibling graphs of the one or more graphs, assigning the instances of the given node equal priorities; and             for instances of occurrence of the given node having an unmatched scope in the sibling graphs, assigning the instances of the given node unequal priorities; and     when the given node comprises the variable component, assigning a low priority to the given node in comparison to nodes comprising the constant component.

13. A system for translating a Simple Protocol and RDF Query Language (SPARQL) query into a Structured Query Language (SQL) query, the system comprising:

a processor; and a computer readable storage medium having program instructions embodied therewith, wherein the computer readable storage medium is not a transitory signal per se, the program instructions executable by a processor to cause the processor to perform a method comprising:

generating one or more graphs from the SPARQL query, wherein the one or more graphs comprise a plurality of nodes;

assigning a priority to each of the plurality of nodes and generate a priority queue based on the assigned priority;

selecting the node having a highest assigned priority from the priority queue;

navigating the one or more graphs to traverse to one or more reached nodes of the plurality of nodes connected to the selected node, comprising:

identifying data corresponding to the one or more reached nodes;

for each reached node having a variable component, updating the priority of the reached node based on the identified data for the reached node; and updating an order of the plurality of nodes in the priority queue based on the updated priorities;

generating an access plan element of the SQL query for the one or more reached nodes traversed and the selected node;

repeating the selecting of the node having the highest assigned priority from the priority queue, the navigating of the one or more graphs to traverse to the one or more reached nodes, and the generating of the access plan element of the SQL query until the priority queue is empty; and generating an access plan for the SQL query comprising the access plan elements generated for the plurality of nodes.

14. The system of claim 13, wherein at least two of the plurality of nodes are connected with one another through an edge, wherein navigating the one or more graphs to traverse to the one or more reached nodes connected to the selected node comprises:

identifying the one or more edges associated with the selected node in the one or more graphs; and navigating the one or more graphs to reach the one or more reached nodes connected to the selected node through the one or more associated edges.

15. The system of claim 14, wherein the one or more graphs are navigated simultaneously through the one or more associated edges to reach the one or more reached nodes connected to the selected node.

16. The system of claim 14, wherein the selected node has multiple occurrences in the one or more graphs, wherein the navigating of the one or more graphs further comprises:

determining a first count of in-edges and a second count of out-edges of the selected node; and based on a higher of the first count and the second count, choosing either the in-edges or the out-edges for navigating from the selected node to one or more reached nodes.

17. The system of claim 13, wherein the assigning of the priority to each of the plurality of nodes comprises:

determining a given node of the plurality of nodes has a constant component;

determining statistics indicating a number of times the given node appears in a database;

when the statistics return a low frequency for the given node, assigning the given node a high priority in comparison to nodes for which the statistics return a high frequency; and when the statistics return the high frequency for the given node, assigning the given node a low priority in comparison to nodes for which the statistics return the low frequency.

18. The system of claim 13, wherein the assigning of the priority to each of the plurality of nodes comprises:

determining whether a given node of the plurality of nodes comprise a constant component or a variable component;

when the given node is determined to comprise the constant component, the assigning comprises:

determining whether the given node of the plurality of nodes has multiple occurrences in the one or more graphs;

when the given node does not have multiple occurrences, assigning to the given node a high priority in comparison to nodes having multiple occurrences;

when the given node has multiple occurrences, the assigning comprises:

determining a scope of each instance of the given node based on an order of a hierarchy of the one or more graphs containing the instances of the given node;

for instances of occurrence of the given node having a matching scope in sibling graphs of the one or more graphs, assigning the instances of the given node equal priorities; and for instances of occurrence of the given node having an unmatched scope in the sibling graphs, assigning the instances of the given node unequal priorities; and when the given node comprises the variable component, assigning a low priority to the given node in comparison to nodes comprising the constant component.

\* \* \* \* \*